Jan. 15, 1963 E. W. CLEM 3,073,198
SLITTING APPARATUS
Filed Oct. 1, 1957

INVENTOR.
EVERETT W. CLEM
BY
ATTORNEYS

United States Patent Office 3,073,198
Patented Jan. 15, 1963

3,073,198
SLITTING APPARATUS
Everett W. Clem, Shrewsbury, Mass., assignor to Rice Barton Corporation, Worcester, Mass., a corporation of Massachusetts
Filed Oct. 1, 1957, Ser. No. 687,560
3 Claims. (Cl. 83—504)

The present invention relates to means for clamping objects on shafts and more particularly to improvements in clamping means for assemblies of the type adapted to be adjustably positioned along a supporting shaft. The invention is especially suitable for, but not necessarily limited to, slitting devices.

Where objects such as pulleys, gears, wheels and the like are releasably or adjustably mounted on a shaft, certain problems may be encountered in connection with the clamping or securing of the object in accurate relation to the shaft. The present invention provides a simple and effectual arrangement which substantially eliminates such problems, while at the same time facilitating the task of manipulating and securing an object on its supporting shaft. One of the most advantageous applications of the invention is in slitting devices or the like and, for purposes of illustration, the invention is described herein as incorporated in a slitting device.

Heretofore, it has been conventional to utilize means, such as set screws or the like, for adjustably securing the slitting knives to their supporting shafts. While such means are suitable for some purposes, they are not entirely satisfactory where the knives must be frequently reset, since the application of torque to the screw, in tightening a knife in place, tends to skew or cock the knife a slight amount on the shaft and cause difficulty in effecting satisfactory alignment. Accordingly, considerable time is required to properly reset, align and clamp the knives, and substantial production losses may be incurred.

In accordance with this invention, slitting knives or the like are provided with novel releasable clamping means for adjustably securing the knives on their supporting shafts in a manner permitting quick reset to gauge and assuring proper alignment of the knives in accurate right-angular relation to the shafts. The new clamping means permits a knife to be quickly released and moved to a new position on its supporting shaft, and to be securely and accurately locked in such new position.

One specific aspect of the invention resides in the provision, in a slitting knife or similar object having a hub slidable over the supporting shaft, of clamping means adapted to be brought into tight, clamping relation to the shaft, in the absence of the application of forces tending to skew or otherwise misalign the knife. The knife or other object may thus be securely held in place without becoming skewed out of the desired right-angular relation to the shaft. In one form of the invention, the clamping member is advantageously in the form of a pneumatically actuated member which is brought into clamping relation by the application thereto of air under pressure.

Another specific aspect of the invention resides in the provision, in a slitting knife or like object of means whereby the object is clamped on its supporting shaft by the application of clamping forces at spaced points, in a manner such that the clamped object is very stable and tends to assume and retain an accurate right-angular relation to the supporting shaft.

A further specific aspect of the invention resides in the provision of an apparatus, such as a slitter, comprising a rotary shaft and a plurality of adjustable members on the shaft, wherein means are provided for retaining the several adjustable members in predetermined rotational alignment. The improved arrangement facilitates the adjustment of a number of members, in that the clamping means for all members may be aligned, and an operator may move quickly from one to another to adjust or reset the members in a minimum time.

For a better understanding of the invention, and for a discussion of other advantageous features thereof, reference should be made to the following specification, and the accompanying drawing, in which.

Figure 1:
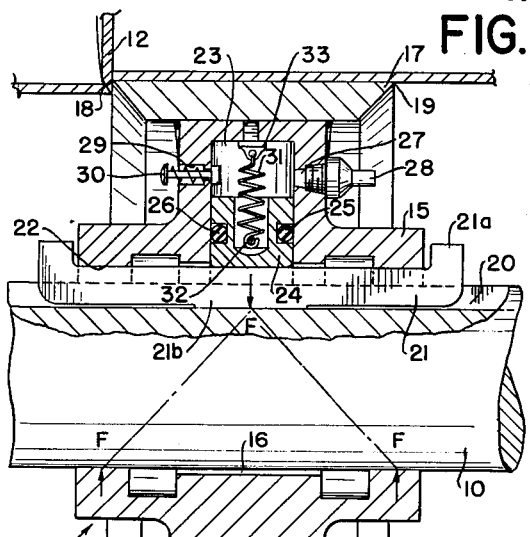
FIG. 1 is a longitudinal cross-sectional view of a slitting knife incorporating improved features of the invention.
Figure 3:
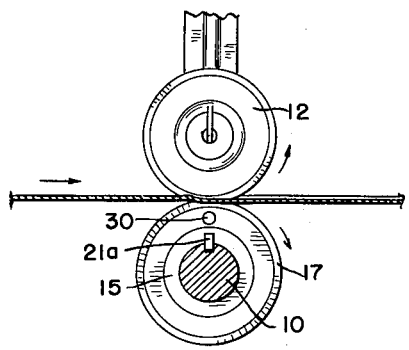
FIG. 3 is a cross-sectional view taken generally along line 3—3 of FIG. 2.
Figure 2:
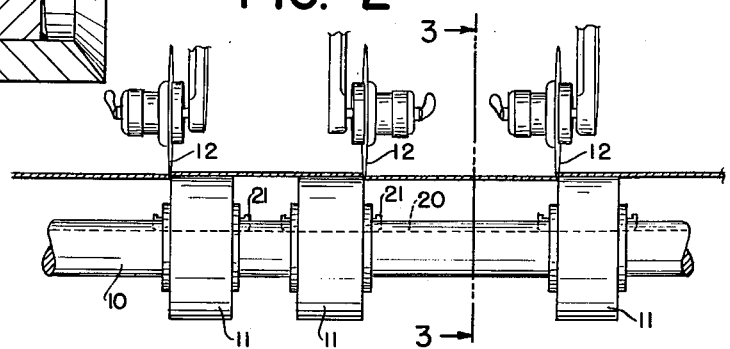
FIG. 2 is a fragmentary front elevational view of a slitter apparatus incorporating knives of the type shown in FIG. 1.

Referring now to the drawing, and initially to FIGS. 1–3 thereof, the reference numeral 10 designates the shaft of a slitting apparatus which, except in the particulars to be described, may be of conventional design. The shaft 10 is supported for rotation and, as a general rule, is connected to suitable driving means (not shown). Mounted on the shaft 10, for rotation therewith, are a plurality of knives 11, to be described in more detail, which are adapted to cooperate with slitting blades 12. The blades 12 may be in the form of thin discs set at a slight angle to the knives 10 and adjustably supported by means such as described in the copending application of Clem et al., Serial No. 479,177, filed December 31, 1954.

In accordance with the present invention, improvements are incorporated into the knives 11, facilitating the quick reset or adjustment thereof along the shafts and assuring proper alignment of the knives with respect to the shafts and with respect to each other. Thus, with particular reference to FIG. 1, the improved knife includes a clamp having a hub 13 having a radial flange 14 and axial flanges 15, surrounding the shaft, the axial dimension of the hub being substantial, relative to the diameter of the shaft. Advantageously, while the outer portions of the axial flanges 15 fit the shaft 10 quite closely, the flanges may be recessed along the central portion of the hub, so that a slight clearance is provided between that portion of the hub and the shaft, as indicated at 16.

Surrounding the radial flange 14 of the hub 13 is an annular knife element 17 which, in the illustrated form of the invention, is welded or otherwise secured to the hub 13 and has cutting edges 18, 19 at its opposite axial ends. One of the cutting edges, such as edge 18, is adapted to coact with a cutting edge of a blade 12, in shearing relation to sever web material moving longitudinally past the edges.

In normal operation of slitting apparatus of the type concerned herein, the slitting knives 11 are rotated with the shaft 10 and, to this end, the shaft is provided substantially throughout its length with a keyway 20 adapted slidably to receive keys 21. The hubs 13 of the respective knives are likewise provided with suitable keyways 22 receiving portions of the keys, so that the knives are positively aligned on the supporting shaft 10. This is an advantageous feature, as will appear, in that the relative rotational alignment of the several knives is fixed, and quick resetting of the knives is thereby facilitated.

In one form of the invention, the hub 13 of each knife is provided with a radially disposed chamber 23, located in the radial flange portion 14 of the hub and opening into the axial bore or opening through the hub. The axis of the chamber 23 advantageously intersects the axis of the keyway 22 in the hub. Received within the chamber 23, and adapted for limited sliding movement therein, is a piston member 24, which may be considered a clamping piston. The piston 24 is provided with an annular groove 25 adapted to receive an O-ring 26 or other element adapted to form a fluid-tight seal between the piston and the walls of the chamber 23. Normally, the piston 24 is held in a retracted position in the chamber 23, by means of an extensible coil spring 31 secured to the piston by a pin 32 and connected to the end of the chamber by an appropriate fitting 33.

Opening into the upper portion of the chamber 23 is an inlet passage 27 connected in series with a valve fitting 28, which may be a suitable check valve or the like adapted to permit a fluid such as air to be discharged into the chamber. Also communicating with the chamber 23 is an outlet passage 29, which is normally closed off by a manually operated valve 30. The arrangement is such that the chamber 23 may be supplied with fluid under pressure through the fitting 28, such fluid being retained within the chamber until the valve 30 is depressed to permit the fluid to escape through the outlet passage 29. It will be readily understood, of course, that the valve 30 and fitting 28 may be combined in a single valve assembly wherever desirable or expedient.

In order to set up the knives 11 for operation, pressure is first released from the chambers 23 by operation of the valves 30. The knives may then be slid along the shaft 10 to any desired positions, the keys 21 being carried along with the hubs 13 by virtue of the outwardly turned end portions 21a of the keys which engage the ends of the hub flanges 15. When the knives are in their desired positions, air or other fluid under pressure is discharged into the chambers 23, forcing pistons 24 to move radially inward and to press inwardly against the keys 21. Advantageously, the keys 21 are formed with central portions 21b of increased thickness, so that the inward forces of the pistons are transmitted through the center portions of the keys and applied to the shafts over relatively limited areas between the ends of the keys.

The pressure of the fluid within the chambers 23 of the respective knives causes reactive forces to be applied to the hubs 13, whereby the hubs are urged in a direction opposite to the pistons. This causes the outer portions of the axial flanges 15 to be brought into pressure engagement with the knife supporting shafts, at points diametrically opposite the clamping pistons 24. The arrangement is such, as in indicated in FIG. 1, by arrows F, as to provide two widely spaced areas of force application along one side of the supporting shaft and a single area of force application at the other side of the shaft, the latter area being located substantially between the first mentioned areas.

As will be readily understood, when the chambers 23 are filled with fluid under pressure, to clamp the knives 11 firmly on the shaft 10, no forces are applied to the knives which would tend to skew the knives out of right-angular relation to the shafts. Rather, the forces applied are directed entirely at right angles to the shafts and tend to draw the axial flanges 15 of the hub into tight engagement with the shaft at widely spaced areas at one side of the shaft. Accordingly, the knives inherently tend to assume an accurate right-angular relationship with respect to the shafts and to be highly stable in such positions as long as clamping force is applied.

It will be noted that any looseness or play between the shafts and the hubs 13 of the knives is automatically taken up when the knives are clamped in place, and does not interfere in any way with the proper alignment of the knives. In this respect, excess looseness between the knives and shafts may cause the knives, when clamped, to be slightly eccentric with respect to their axes of rotation. However, such eccentricity is of little or no importance in that it has no effect on the shearing action between adjacent knives.

The knives may be quickly reset or moved from one position to another and set to proper gauge by merely first releasing the pressure fluid from the chambers 23 and sliding the knives to any desired new position. When the knives are positioned as desired, pressure fluid is injected into the chambers 23, and the resetting is completed. In this respect, it is contemplated that air under pressure may be advantageously used to operate the clamping pistons 24, and a flexible hose, leading to an appropriate supply of compressed air, may be kept conveniently at hand near the slitting apparatus.

In accordance with one specific feature of the invention, the several knives 11 are held on the shaft 10 in predetermined, fixed angular relationship, by means of the keys 21 and keyway 20, and the fluid fittings 28 and valves 30 are arranged in predetermined relation to the keys 21. Accordingly, by locating the valve and fitting of one knife in an accessible position, an operator automatically locates the valves and fittings of the other knives, and resetting of all the knives may be completed in a practical minimum of time.

Figure 4:
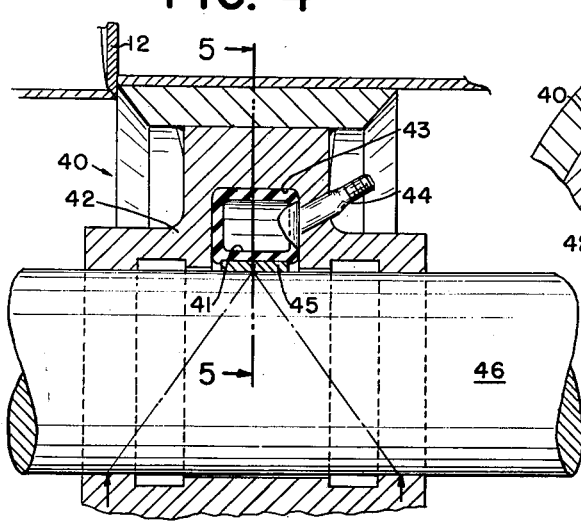
FIG. 4 is a fragmentary cross-sectional view of a slitting knife incorporating a modified form of the new clamping means.
Figure 5:
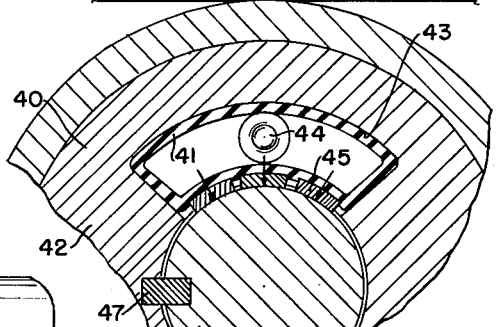
FIG. 5 is a cross-sectional view taken along line 5—5 of FIG. 4.

In the form of the invention illustrated in FIGS. 4 and 5, the slitting knife 40, which may in general be similar to the knife of FIGS. 1-3, is provided with a flexible fluid-expansible clamping element or unit 41, in place of the piston-chamber arrangement of FIGS. 1-3. Thus, the element 41 may be an inflatable member, formed of rubber or the like and having an arcuate form, substantially as indicated in FIG. 5. The hub 42 of the knife 40 is provided with an arcuate recess 43, extending over an arc of, for example, 90° and opening toward the supporting shaft 10. The dimensions of the recess 43 are such as to closely receive the inflatable element 41, and when the element is deflated it is contained substantially wholly within the recess.

At one side of the inflatable element is a valve tube 44, which extends through a suitable opening in the hub wall and is accessible at the side of the knife. The valve tube permits the element 41 to be controllably inflated or deflated, as desired.

As shown best in FIG. 5, the inner wall of the inflatable element 41 carries a plurality of pressure discs 45 which are adapted to bear against the outer surface of knife-supporting shaft 46. When the element 41 is inflated, the pressure discs 45 are pressed firmly against the shaft 46 to lock the knife in a adjusted position, in accurate right angular relation to the shaft.

A key 47 locks the knife 40 and shaft 46 against relative rotation and maintains a plurality of knives in predetermined angular relation on a single shaft. Accordingly, an operator may readily locate the valve tubes of a plurality of knives for quickly resetting a slitter apparatus to gauge.

The invention is especially useful in connection with apparatus for slitting thin material, such as paper, for example, where it is important to quickly adjust or reset slitting knives to a new gauge. Heretofore, it has been difficult to reset slitting knives to gauge on a supporting shaft due to the tendency of the knives to skew as they were tightened on the shaft. With the new apparatus, the knives may be adjusted quickly to desired positions and clamped in place in the absence of any forces which tend to skew the knives on their shafts. Moreover, the arrangement of the clamping mechanism is such that the knives are highly stable in their clamped positions and tend, under all conditions, to assume the desired right-angular positions with respect to their supporting shafts.

In one preferred form of the invention, the clamping mechanism comprises a pneumatic or fluid operated clamping piston which applies clamping pressure to a localized area of the shaft, while simultaneously causing the hub of the knife to apply clamping pressure to the opposite side of the shaft, at widely spaced areas. The clamping piston applies pressure to the shaft through an intermediate member, which intermediate member may also serve to key the knife to its supporting shaft for rotation. This is advantageous for several reasons, including the avoidance of marking or deforming the outer surface of the supporting shaft. In another preferred form of the invention, the clamping mechanism comprises an inflatable element received in a recess in the knife hub and adapted upon inflation to apply clamping pressure to the knife supporting shaft.

Where the new clamping arrangement is employed to adjustably secure a plurality of objects, such as slitting knives, on a common shaft, while providing for quick reset, the several objects may advantageously be keyed to the shaft, so that the various clamping means may be readily located and actuated.

It should be understood that the apparatus illustrated and described herein is intended to be representative only, as certain changes may be made therein without departing from the clear teachings of the invention. Specifically, it will be understood that the invention is not necessarily limited to slitting devices, but may be utilized in connection with the clamping of any object on a shaft. Accordingly, reference should be made to the following appended claims in determining the full scope of the invention.

I claim:

1. In a paper slitter adapted for adjustable positioning on a slitter shaft, the improvement comprising in combination with a slitter shaft of a hub adapted to be slidably received over said slitter shaft, said hub having spaced clamping surfaces adapted to bear against one side of said shaft at axially spaced points, a closed radial chamber located within said hub on the diametrically opposite side of said shaft and substantially centrally between said spaced clamping surfaces, a piston slidably received in said chamber for movement toward and away from said shaft, means for normally urging said piston in a direction away from said shaft, a one-way valve adapted to permit fluid under pressure to be discharged into said chamber to move said piston radially inwardly to engage said shaft and move said clamping surfaces into engagement with said shaft whereby said hub is clamped to said shaft, and a selectively operable exhaust valve for exhausting fluid from said chamber to permit the piston to move away from said shaft.

2. In a paper slitter adapted for adjustable positioning on a slitter shaft the improvement comprising in combination with a slitter shaft of a hub adapted to be slidably received over said slitter shaft, said hub having spaced clamping surfaces adapted to bear against one side of said shaft at axially spaced points, movable clamping means comprising a fluid operated piston, a chamber for slidably receiving said piston located in said hub on the diametrically opposite side of said shaft and substantially centrally between said spaced clamping surfaces and means for moving said clamping means to exert a force against the inner surface of said hub and the outer surface of said shaft on said opposite side of the shaft to press said spaced clamping surfaces against said shaft.

3. A clamp adapted for adjustably positioning an object on a shaft, comprising a hub adapted to be slidably received on the shaft, said hub having spaced clamping surfaces adapted to bear against one side of said shaft at axially spaced points, clamping means comprising a fluid operated member located in said hub and movable radially therein on the diametrically opposite side of said shaft and substantially centrally between said spaced clamping surfaces and means for moving said clamping means to exert a force against the inner surface of said hub and the outer surface of said shaft on said opposite side of the shaft to press said clamping surfaces against said shaft.

References Cited in the file of this patent

UNITED STATES PATENTS

| | | |
|---|---|---|
| 311,396 | Westbrook | Jan. 27, 1885 |
| 635,684 | Herschmann | Oct. 24, 1899 |
| 673,473 | Peuckert | May 7, 1901 |
| 802,572 | King | Oct. 24, 1905 |
| 827,023 | Knoener | July 24, 1906 |
| 1,584,868 | Kutter | May 18, 1926 |
| 1,797,662 | Johnston | Mar. 24, 1931 |
| 1,985,856 | Evans | Dec. 25, 1934 |
| 2,120,182 | Limpp | June 7, 1938 |
| 2,166,391 | Borland | July 18, 1939 |
| 2,239,623 | Oster | Apr. 22, 1941 |
| 2,377,130 | Cohen | May 29, 1945 |
| 2,657,852 | Spase | Nov. 3, 1953 |
| 2,760,800 | Wekeman | Aug. 28, 1956 |
| 2,801,694 | Schneider | Aug. 6, 1957 |
| 2,898,136 | Hall | Aug. 4, 1959 |